(12) United States Patent
Schlienger et al.

(10) Patent No.: US 8,517,679 B2
(45) Date of Patent: Aug. 27, 2013

(54) COMPRESSOR-SIDE SHAFT SEAL OF AN EXHAUST-GAS TURBOCHARGER

(75) Inventors: Joel Schlienger, Zurich (CH); Patrick Aberle, Untersiggenthal (CH)

(73) Assignee: ABB Turbo Systems AG, Baden (CH)

( * ) Notice: Subject to any disclaimer, the term of this patent is extended or adjusted under 35 U.S.C. 154(b) by 672 days.

(21) Appl. No.: 12/705,399

(22) Filed: Feb. 12, 2010

(65) Prior Publication Data

US 2010/0202875 A1  Aug. 12, 2010

(30) Foreign Application Priority Data

Feb. 12, 2009 (EP) .................................. 09152668

(51) Int. Cl.
*F01D 11/08* (2006.01)

(52) U.S. Cl.
USPC .................... 415/230; 415/173.4; 415/174.4; 277/434

(58) Field of Classification Search
USPC ........... 415/229–231, 173.3, 111, 113, 170.1, 415/174.2–3; 417/407, 409; 277/346, 434, 277/493, 505, 417, 361, 364, 419
See application file for complete search history.

(56) References Cited

U.S. PATENT DOCUMENTS

| | | | |
|---|---|---|---|
| 3,565,497 A | 2/1971 | Miller | |
| 4,196,910 A * | 4/1980 | Aizu | 277/419 |
| 4,198,063 A * | 4/1980 | Shimizu et al. | 277/387 |
| 4,314,705 A * | 2/1982 | Shimizu | 277/346 |
| 4,865,332 A | 9/1989 | Ruetz | |
| 4,986,733 A | 1/1991 | Fleury et al. | |
| 5,176,497 A | 1/1993 | Deacon et al. | |

FOREIGN PATENT DOCUMENTS

| | | |
|---|---|---|
| DE | 2 025 125 | 5/1970 |
| DE | 37 37 932 A1 | 5/1989 |
| EP | 1 130 220 A2 | 9/2001 |
| EP | 1 394 451 A1 | 3/2004 |
| EP | 1 507 106 B1 | 7/2007 |
| GB | 1 291 389 A | 10/1972 |
| JP | 48-26304 U | 3/1973 |
| JP | 61-135941 A | 6/1986 |
| JP | 8-121109 A | 5/1996 |

OTHER PUBLICATIONS

Translation of EP 1507106 provided by Espacenet.*
European Search Report for EP 09152668.1 dated Jul. 24, 2009.

* cited by examiner

*Primary Examiner* — Nathaniel Wiehe
*Assistant Examiner* — Justin Seabe
(74) *Attorney, Agent, or Firm* — Buchanan Ingersoll & Rooney PC

(57) ABSTRACT

The piston ring sealing points of a sealing apparatus between the rotor and the housing of a continuous-flow machine each have a piston ring, a cylindrical contact surface, which is directed radially inward, on the housing, as well as an axial stop on the rotor. In this case, the piston ring of the outer piston ring sealing point has a larger external radius and a smaller internal radius than the piston ring of the inner piston ring sealing point. At the same time, the outer piston ring sealing point has a smaller internal radius than the inner piston ring sealing point. Because of the V-shaped arrangement concept, there is no need for a steel ring, shrunk onto the rotor, between the piston ring sealing points.

17 Claims, 2 Drawing Sheets

COMPRESSOR-SIDE SHAFT SEAL OF AN EXHAUST-GAS TURBOCHARGER

RELATED APPLICATION

This application claims priority under 35 U.S.C. §119 to European Patent Application No. 09152668.1 filed in Europe on Feb. 12, 2009, the entire content of which is hereby incorporated by reference in its entirety.

FIELD

The present disclosure relates to the field of continuous-flow machines, such as exhaust-gas turbochargers for super charged internal combustion engines. More particularly, the present disclosure relates to a sealing apparatus between the rotor and the housing of a continuous-flow machine, to a continuous-flow machine having such a sealing apparatus, and to an exhaust-gas turbocharger having such a sealing apparatus.

BACKGROUND INFORMATION

Nowadays, exhaust-gas turbochargers are used as standard in order to increase the power of an internal combustion engine. The exhaust-gas turbocharger has an exhaust-gas turbine in the exhaust-gas tract of the internal combustion engine, and has a compressor which supplies air for the combustion process to the combustion chamber of the internal combustion engine. With the boosting of the internal combustion engine, the amount of air and fuel into the cylinders is increased, resulting in a noticeable increase in the power of the internal combustion engine. The exhaust-gas turbocharger which is used for this purpose comprises a rotor, having a shaft, a compressor wheel, a turbine wheel and if need be further components arranged on the shaft, as well as the shaft bearing, the flow-guiding housing parts (compressor housing, turbine housing) and the bearing housing.

As a result of the high process pressures, which are dependent on the current operating point of the exhaust-gas turbocharger, in the turbine-side and compressor-side flow area of an exhaust-gas turbocharger, the internal area of the bearing housing must be sealed from the flow channel by means of a shaft seal, in order to minimize gas leakage into the internal area. The pressure in the internal area normally corresponds to atmospheric pressure.

DE2025125 discloses a sealing apparatus for exhaust-gas turbochargers, in which one or two sealing elements is or are arranged on the compressor side, and at least one sealing element is arranged on the turbine side. The sealing elements are split piston rings which are pulled on over the turbocharger shaft and are inserted into grooves in the turbocharger shaft. The piston rings are adequately prestressed radially such that, when they are in the installed state, they rest radially on the stationary housing wall according to the laid-open specification, and remain positioned axially in the housing by virtue of the friction forces which occur in this case.

EP1130220 and EP1507106 disclose sealing apparatuses for exhaust-gas turbochargers, in which an axial stop shoulder is additionally provided on the stationary housing, on which stop shoulder the piston ring rests in an interlocking manner when a pressure difference is applied, thus remaining in a predetermined axial position. In this case, the piston ring is ground in on the rotating grinding-in surface, and thus seals the flow channel from the internal area of the bearing housing. The rotating piston ring groove is in this case slightly broader than the stationary piston ring. The pressure difference ensures that the piston ring is moved in the direction of the grinding-in surface, and is ground off in the process, until it rests on the axial stop shoulder on the housing hole. Grinding-in of the piston rings results in a better sealing effect, since this makes it possible to minimize the axial sealing gap between the piston ring and the grinding-in surface on the opposing piece. In general, seals without ground-in piston rings have higher leakage rates.

For tribological reasons, the grinding-in surfaces of the rotating opposing piece of a piston ring formed using gray cast iron (GG25) should not be composed of aluminum. The grinding-in surfaces on the rotating element should therefore always be formed from steel for conventional sealing apparatuses for exhaust-gas turbochargers with ground-in piston rings.

In the sealing apparatus for exhaust-gas turbochargers according to U.S. Pat. No. 5,176,497, the piston ring is secured axially by a screwed compressor wheel composed of aluminum and a sealing disk which also rotates on the turbocharger shaft. In this case, because of the pressure difference between the flow channel and the internal area of the bearing housing, the soft piston ring grinds itself in on the axial grinding-in surface of the sealing disk and thus produces the desired sealing effect. The compressor wheel is braced via the sealing disk by means of the screw connection to the turbocharger shaft. As disclosed in U.S. Pat. No. 4,986,733, the piston ring can also be mounted in a circumferential groove in the sealing disk, such that the piston ring does not make direct contact with the compressor wheel.

Building on this concept, in the case of the sealing apparatus for exhaust-gas turbochargers according to DE3737932, two piston rings are used as sealing elements for the turbine-side seal.

In the case of sealing apparatuses having two piston rings, the piston rings generally have different external ring diameters, for assembly reasons. In this case, the external diameter of the inner piston ring is less than the external diameter of the outer piston ring. Piston rings formed in this way allow the turbocharger shaft to be inserted axially, with the piston rings fitted, into the tapering housing opening. If the inner piston ring is provided with a larger external diameter than the outer piston ring, it is generally no longer possible to remove the inner piston ring without destroying the piston ring. In order to offer a hard grinding-in surface for the outer piston ring in the axial direction, an additional ring composed of a hard and wear-resistant material (for example steel) is required for conventional sealing apparatuses, and this is shrunk onto the compressor wheel between the inner and the outer piston ring. The extent of shrinkage requires very tight manufacturing tolerances. The process of shrinking on the steel ring can significantly influence the contact pattern of the thread and the loads in the screw connection between the compressor wheel and the shaft.

SUMMARY

An exemplary embodiment provides a sealing apparatus between the rotor and the housing of a continuous-flow machine. The rotor includes a shaft and at least one bladed wheel, and the shaft is arranged in a shaft bushing hole in the housing. The exemplary sealing apparatus comprises two piston ring sealing points, which are arranged at an axial distance from one another. The two piston ring sealing points comprise an outer piston ring sealing point which is located closest to the bladed wheel, and an inner piston ring sealing point. The piston ring sealing points each comprise a piston ring, a cylindrical contact surface on the housing, and an axial stop on the rotor. The piston ring of the outer piston ring sealing point has an external radius which is greater than the external radius of the piston ring of the inner piston ring sealing point. The piston ring of the outer piston ring sealing point has an internal radius which is less than the internal radius of the piston ring of the inner piston ring sealing point.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Exemplary embodiments of the present disclosure provide a sealing apparatus between the rotor and the housing of a continuous-flow machine, for example the compressor-side shaft seal of an exhaust-gas turbocharger, with two or more piston rings and rotating grinding-in surfaces, which can easily be fitted and removed and which does not require any additional components used specifically for the seal on the rotor and/or on the housing.

The exemplary sealing apparatus according to the present disclosure between the rotor and the housing of a continuous-flow machine comprises two piston ring sealing points, which are arranged at an axial distance from one another, with the piston ring sealing points each comprising a piston ring, a cylindrical contact surface, which is directed radially inward, on the housing, and an axial stop on the rotor. In this case, the piston ring of the one, outer piston ring sealing point facing the bladed wheel has an external radius which is greater than the external radius of the piston ring at the other, inner piston ring sealing point. At the same time, the piston ring at the outer piston ring sealing point has an internal radius which is less than the internal radius of the piston ring at the inner piston ring sealing point. The rotor comprises a shaft and at least one bladed wheel, if need be, as well as further components which are arranged on the shaft, such as a sealing disk or a spacer disk.

The V-shaped arrangement concept according to an exemplary embodiment of the present disclosure means that there is no need for a steel ring to be shrunk onto the rotor between the piston ring sealing points, as is required for a conventional arrangement concept with two or more piston ring sealing points with identical internal radii. Furthermore, the exemplary arrangement according to the present disclosure allows non-destructive removal and simple fitting of the piston rings.

The piston rings can optionally rest axially on stop shoulders on the housing.

The grinding-in surfaces on the rotor advantageously form an appropriate combination of materials with the piston ring material for the purpose. If the grinding-in surfaces are manufactured from a hard and wear-resistant material, such as steel, the grinding-in behavior of the piston rings and their sealing effect can be improved.

Approach to Implementation of the Present Disclosure

Figure 1:
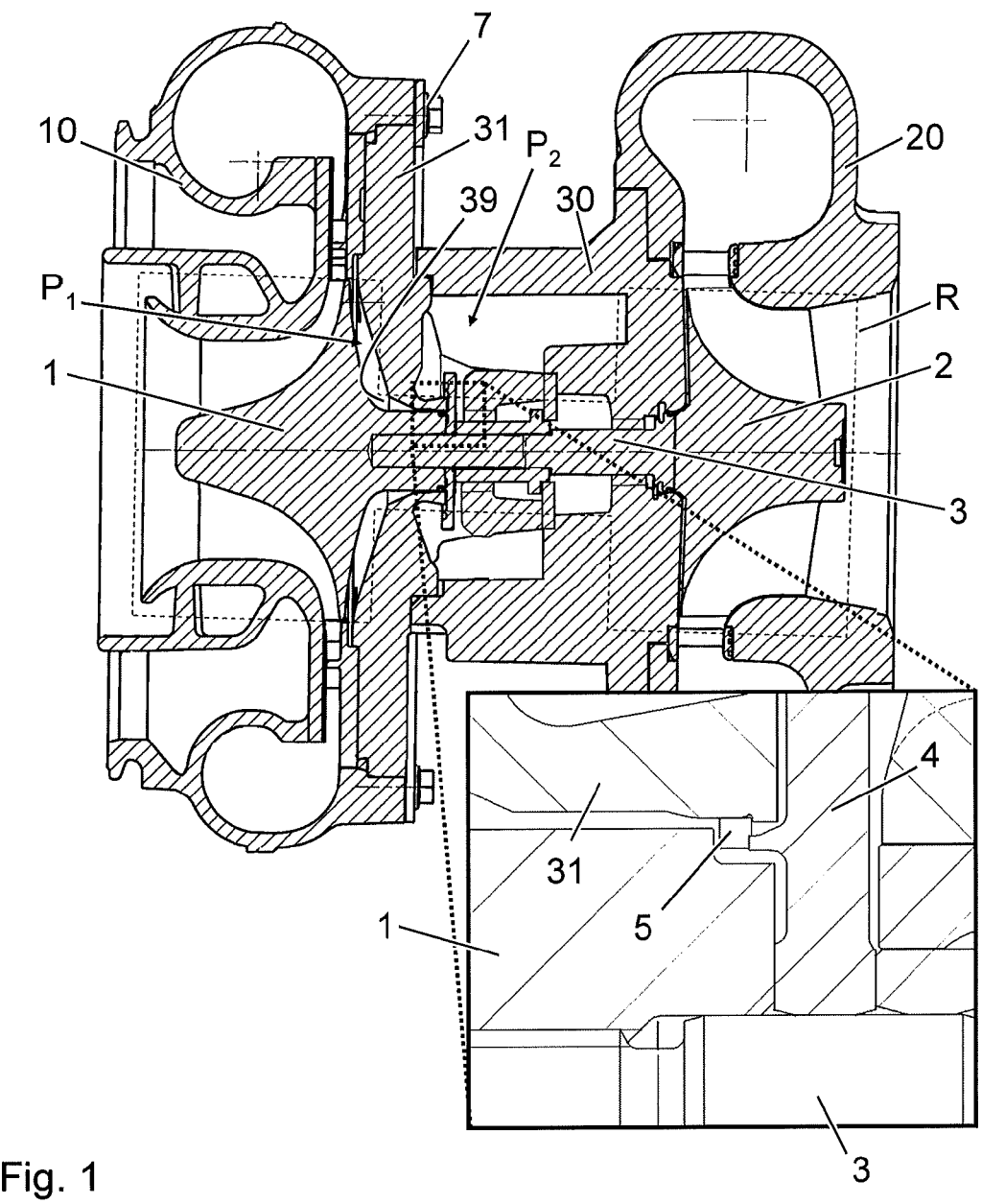
FIG. 1 shows a section through a known exhaust-gas turbocharger, with a stationary housing and a rotor, with the compressor-side sealing apparatus being enlarged and illustrated in detail.

As an example of a continuous-flow machine, FIG. 1 shows a known exhaust-gas turbocharger, with a radial compressor and a radial turbine. The turbine wheel 2 of the turbine is mounted on the shaft 3, and is formed integrally with the shaft. The turbine housing 20 surrounds the turbine wheel 2 and bounds the flow channels in which the hot exhaust gas from the internal combustion engine is passed via the turbine wheel to the exhaust installations. The compressor wheel 1 is likewise mounted on the shaft 3. The bearing housing is generally composed of a plurality of housing parts, and in the illustrated case comprises a housing part 30 containing the bearing and a housing cover 31 which, on the compressor side, closes the cavity that is surrounded by the bearing housing. A central shaft bushing hole 39 is incorporated in the housing cover 31 of the bearing housing, and the shaft 3 is guided in it. In the area of this shaft bushing hole 39, the compressor-side sealing apparatus is arranged between the rotating assembly (rotor R) and the bearing housing. In the illustrated example, the compressor-side sealing apparatus in the known exhaust-gas turbocharger has a single piston ring 5, which provides a seal between the assembly, comprising the shaft 3, the sealing disk 4 and the compressor wheel 1, and the stationary housing parts 31. The compressor-side sealing apparatus seals the area, which is at an increased pressure $P_1$, at the rear of the compressor wheel from the cavity, which is at normal pressure $P_2$, in the interior of the bearing housing 30.

During assembly of the compressor, the sealing disk 4 is first of all pushed onto the shaft 3, which has been inserted into the bearing housing, from the compressor side. The housing cover 31 together with the piston ring 5, which has been inserted into the shaft bushing hole 39, is then placed on the bearing housing 30. The compressor wheel 1 is then placed on the end of the shaft, and is connected to the shaft. During this process, the sealing disk 4 is clamped firmly on the shaft, between the compressor wheel 1 and an axial step. An annular groove, in which the piston ring 5 is arranged, remains between the compressor wheel and the sealing disk. Finally, the compressor housing 10 is placed on the bearing housing, and is screwed tight by means of the external attachment 7.

Figure 2:
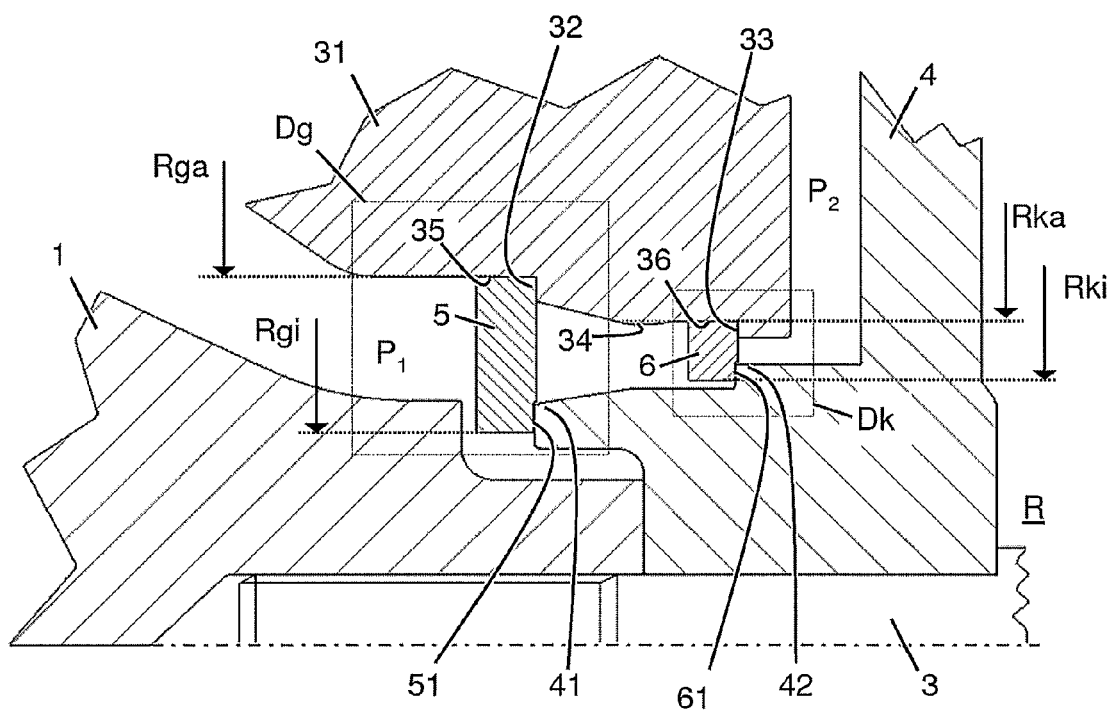
FIG. 2 shows a section through a compressor-side sealing apparatus according to an exemplary embodiment of the present disclosure, between the rotor and the housing of the exhaust-gas turbocharger as shown in FIG. 1.

FIG. 2 shows the detail of an exhaust-gas turbocharger, illustrated enlarged in the preceding figure, with an exemplary sealing apparatus according to an embodiment of the present disclosure.

According to an exemplary embodiment of the present disclosure, the sealing apparatus has two, or in general a plurality of, piston ring seals Dg and Dk, which are arranged axially one behind the other and have radially different dimensions. A piston ring seal in each case comprises a cylindrical contact surface 35, 36 on the stationary housing 31, a respective axial projection 41, 42 on the rotor with an axial stop surface, and a respective piston ring 5, 6. The piston rings 5, 6 are radially prestressed and are fitted into the cylindrical contact surfaces 35, 36, with an axial end face resting on the axial projection 41, 42. During operation, a grinding-in process takes place on the piston rings 5, 6 in the area of the stop surface on the axial projections 41, 42, thus forming the grinding-in surfaces 51, 61. Optionally, axial stops 32, 33 are formed on the housing 31, and limit the axial movement capability of the piston rings 5, 6, and therefore the axial grinding-in depth.

As mentioned, according to an exemplary embodiment of the present disclosure, the piston ring seals Dg, Dk have different dimensions in the radial direction. Starting from the outermost piston ring seal Dg, that is to say the piston ring seal which is closest to the compressor wheel rear area, the cylindrical contact surfaces 35, 36 on the housing and the axial projections 41, 42 on the rotor of the piston ring seals Dg, Dk form a V-shaped constriction. The internal radius of the cylindrical contact surface 35 at the outer piston ring sealing point Dg is greater than the internal radius of the cylindrical contact surface 36 at the inner piston ring sealing point Dk, and the maximum radial extent of the axial stop 41 at the outer piston ring sealing point Dg is less than the maximum radial extent of the axial stop 42 at the inner piston ring sealing point Dk.

Corresponding to this V-shaped constriction, the piston rings have been dimensioned such that the piston ring 5 at the outer piston ring sealing point Dg facing the bladed wheel in each case has an external radius Rga which is greater than the external radius Rka of the piston ring 6 at the inner piston ring sealing point Dk, and such that the piston ring 5 at the outer piston ring sealing point Dg has an internal radius Rgi which is less than the internal radius Rki of the piston ring 6 at the inner piston ring sealing point Dk.

If there are more than two piston ring seals arranged axially one behind the other, the piston rings are designed to be stepped with a decreasing external radius and an increasing internal radius, the cylindrical contact surfaces are designed to be stepped with a decreasing internal radius, and the axial stops are designed to be stepped with an increasing maximum radial extent from one piston ring sealing point to the next piston ring sealing point, in each case in the direction facing away from the bladed wheel.

The piston ring 5 of the outermost piston ring seal Dg is axially locked by the clamping connection between the compressor wheel 1 and the sealing disk 4. For the possible situation in which there is a reduced pressure in the flow channel—that is to say when the pressure $P_1$ to the rear of the compressor wheel is lower than the pressure $P_2$ in the cavity in the interior of the bearing housing—the piston ring 6 of the inner piston ring seal Dg must likewise be secured axially. For this purpose, a small radial recess 34 is provided in the bearing housing 31, is used as an axial stop edge for the piston ring 6, and prevents the piston ring 6 from moving in the direction of the outer piston ring seal. The internal radius of the recess 34 is slightly less than the internal radius of the cylindrical contact surface 36.

The piston rings 5, 6 are mounted in advance in the shaft bushing hole 39 in the housing cover 31 during turbocharger assembly, before the housing cover 31, together with the piston rings 5, 6 inserted in it, is placed on the bearing housing 30 and is screwed tight.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Compressor wheel
10 Compressor housing
2 Turbine wheel
20 Turbine housing
3 Shaft of the exhaust-gas turbocharger
30, 31 Bearing housing
32, 33 Axial stop (stator)
34 Radial recess (stator)
35, 36 Cylindrical contact surface
39 Shaft bushing hole
4 Sealing disk (component rotating with the shaft)
41, 42 Axial projection with contact surface (rotor)
5, 6 Piston ring
51, 61 Grinding-in surface on the piston ring
7 Housing connection
Dg, Dk Piston ring sealing points
Rga, Rka External radius of the piston rings
Rgi, Rki Internal radius of the piston rings
R Rotor (comprising 1, 2, 3, 4)
$P_1$ Pressure in the rear of the compressor wheel
$P_2$ Pressure in the interior of the bearing housing

What is claimed is:

1. A sealing apparatus between a rotor and a housing of a continuous flow machine, wherein the rotor comprises a shaft and at least one bladed wheel, and the shaft is arranged in a shaft bushing hole in the housing,
    wherein the sealing apparatus comprises two piston ring sealing points, which are arranged at an axial distance from one another, the two piston ring sealing points comprising an outer piston ring sealing point which is located closest to the bladed wheel, and an inner piston ring sealing point,
    wherein the piston ring sealing points each comprise a piston ring, a cylindrical contact surface on the housing, and a projection with an axial stop surface on the rotor,
    wherein the piston ring of the outer piston ring sealing point has an external radius which is greater than an external radius of the piston ring of the inner piston ring sealing point,
    wherein the piston ring of the outer piston ring sealing point has an internal radius which is less than an internal radius of the piston ring of the inner piston ring sealing point,
    wherein an internal radius of the cylindrical contact surface of the outer piston ring sealing point is greater than an internal radius of the cylindrical contact surface of the inner piston ring sealing point, and
    wherein a maximum radial extent of the axial stop surface on the projection on the rotor of the outer piston ring sealing point is less than a maximum radial extent of the axial stop surface on the projection on the rotor of the inner piston ring sealing point, such that the axial stop surfaces on the projections on the rotor are radially stepped with respect to one another.

2. The sealing apparatus as claimed in claim 1, wherein a radial recess edge is arranged between the cylindrical contact surface of the outer piston ring sealing point and the cylindrical contact surface of the inner piston ring sealing point on the housing, the radial recess edge having a very small radial extent which is less than the internal radius of the cylindrical contact surface of the inner piston ring sealing point.

3. The sealing apparatus as claimed in claim 1, wherein on the side of the cylindrical contact surfaces facing away from the bladed wheel, the housing in each case has a radial step with a smaller diameter, which radial steps each form an axial stop for the piston rings.

4. The sealing apparatus as claimed in claim 1, comprising a plurality of the piston ring sealing points,
    wherein, in the direction facing away from the bladed wheel from one piston ring sealing point to the next piston ring sealing point,
    the piston rings are each stepped with a decreasing external radius and an increasing internal radius,
    the cylindrical contact surfaces are each stepped with a decreasing internal radius, and the axial stops are each stepped with an increasing maximum radial extent.

5. The sealing apparatus as claimed in claim 4, wherein on the side of the cylindrical contact surfaces facing away from the bladed wheel, the housing in each case has a radial step with a smaller diameter, the radial steps each forming an axial stop for the respective piston rings.

6. The sealing apparatus as claimed in claim 4, wherein a radial recess edge is arranged between the cylindrical contact surfaces of two adjacent piston ring sealing points on the housing and has a very small radial extent, which is less than the internal radii of the cylindrical contact surface of the two adjacent piston ring sealing points arranged on the side facing away from the bladed wheel.

7. The sealing apparatus as claimed in claim 6, wherein on the side of the cylindrical contact surfaces facing away from the bladed wheel, the housing in each case has a radial step with a smaller diameter, the radial steps each forming an axial stop for the respective piston rings.

8. A continuous-flow machine, comprising a sealing apparatus between a rotor, which has a shaft and a bladed wheel, and a housing of the continuous flow machine, wherein the sealing apparatus is the sealing apparatus as claimed in claim 1.

9. An exhaust gas turbocharger, comprising a sealing apparatus between a rotor, which has a shaft and a compressor wheel, and a housing of the exhaust gas turbocharger, wherein the sealing apparatus is the sealing apparatus as claimed in claim 1.

10. The sealing apparatus as claimed in claim 1, wherein a radial recess edge is arranged between the cylindrical contact surface of the outer piston ring sealing point and the cylindrical contact surface of the inner piston ring sealing point on the housing, the radial recess edge having a very small radial extent which is less than the internal radius of the cylindrical contact surface of the inner piston ring sealing point.

11. The sealing apparatus as claimed in claim 1, wherein on the side of the cylindrical contact surfaces facing away from the bladed wheel, the housing in each case has a radial step with a smaller diameter, which radial steps each form an axial stop for the piston rings.

12. The sealing apparatus as claimed in claim 1, comprising a plurality of the piston ring sealing points, wherein, in the direction facing away from the bladed wheel from one piston ring sealing point to the next piston ring sealing point, the piston rings are each stepped with a decreasing external radius and an increasing internal radius, the cylindrical contact surfaces are each stepped with a decreasing internal radius, and the axial stops are each stepped with an increasing maximum radial extent.

13. The sealing apparatus as claimed in claim 12, wherein on the side of the cylindrical contact surfaces facing away from the bladed wheel, the housing in each case has a radial step with a smaller diameter, the radial steps each forming an axial stop for the respective piston rings.

14. The sealing apparatus as claimed in claim 12, wherein a radial recess edge is arranged between the cylindrical contact surfaces of two adjacent piston ring sealing points on the housing and has a very small radial extent, which is less than the internal radii of the cylindrical contact surface of the two adjacent piston ring sealing points arranged on the side facing away from the bladed wheel.

15. The sealing apparatus as claimed in claim 14, wherein on the side of the cylindrical contact surfaces facing away from the bladed wheel, the housing in each case has a radial step with a smaller diameter, the radial steps each forming an axial stop for the respective piston rings.

16. A continuous-flow machine, comprising a sealing apparatus between the rotor, which has a shaft and a bladed wheel, and the housing of the continuous flow machine, wherein the sealing apparatus is the sealing apparatus as claimed in claim 1.

17. An exhaust gas turbocharger, comprising a sealing apparatus between a rotor, which has a shaft and a compressor wheel, and a housing of the exhaust gas turbocharger, wherein the sealing apparatus is the sealing apparatus as claimed in claim 1.

* * * * *